US012565581B2

(12) United States Patent
Zheng et al.

(10) Patent No.: US 12,565,581 B2
(45) Date of Patent: Mar. 3, 2026

(54) AQUEOUS DISPERSION OF MULTISTAGE POLYMERIC PARTICLES

(71) Applicants: Dow Global Technologies LLC, Midland, MI (US); Rohm and Haas Company, Collegeville, PA (US)

(72) Inventors: Baoqing Zheng, Shanghai (CN); Tao Wang, Shanghai (CN); Xiaohong Yang, Shanghai (CN); Jinfei Wang, Shanghai (CN); Jia Tang, Shanghai (CN); Jieying Chen, Shanghai (CN); Fengzhe Shi, Shanghai (CN); Shaoguang Feng, Shanghai (CN)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 492 days.

(21) Appl. No.: 18/034,156

(22) PCT Filed: Dec. 3, 2020

(86) PCT No.: PCT/CN2020/133537
§ 371 (c)(1),
(2) Date: Apr. 27, 2023

(87) PCT Pub. No.: WO2022/116076
PCT Pub. Date: Jun. 9, 2022

(65) Prior Publication Data
US 2023/0392000 A1 Dec. 7, 2023

(51) Int. Cl.
*C08L 33/12* (2006.01)
*C08L 33/08* (2006.01)
*C09D 133/08* (2006.01)
*C09D 133/12* (2006.01)

(52) U.S. Cl.
CPC .............. *C08L 33/12* (2013.01); *C08L 33/08* (2013.01); *C09D 133/08* (2013.01); *C09D 133/12* (2013.01)

(58) Field of Classification Search
CPC ....... C08L 33/12; C08L 33/08; C09D 133/08; C09D 133/12
USPC .......................................................... 524/460
See application file for complete search history.

(56) References Cited

U.S. PATENT DOCUMENTS

| | | | |
|---|---|---|---|
| 3,668,183 A | 6/1972 | Hoy et al. | |
| 4,215,195 A | 7/1980 | Ponticello et al. | |
| 5,889,098 A | 3/1999 | Trumbo | |
| 8,772,386 B2 | 7/2014 | Xu et al. | |
| 2003/0224184 A1 | 12/2003 | Hermes et al. | |
| 2017/0145244 A1* | 5/2017 | Yang ................... | C09D 133/066 |
| 2021/0292455 A1* | 9/2021 | Wu ......................... | C09D 5/022 |

FOREIGN PATENT DOCUMENTS

| | | |
|---|---|---|
| CN | 105367698 | 3/2016 |
| WO | 1993016133 | 8/1993 |

OTHER PUBLICATIONS

Fox, Bull. Am. Physics Soc., 1956, vol. 1, No. 3, p. 123.
Vardareli, Polymerization and Characterization of Allyl Methacrylate, 2006.
Search Report and Written Opinion from corresponding International Application No. PCT/CN2020/133537.

* cited by examiner

*Primary Examiner* — Kelechi C Egwim
(74) *Attorney, Agent, or Firm* — CANTOR COLBURN LLP

(57) ABSTRACT
An aqueous dispersion of multistage polymeric particles comprises at least two polymers, and a coating composition comprising such aqueous dispersion of multistage polymeric particles can provide coatings with hot resistance, alcohol resistance, alkali resistance and acetic acid resistance.

15 Claims, No Drawings

AQUEOUS DISPERSION OF MULTISTAGE POLYMERIC PARTICLES

FIELD OF THE INVENTION

The present invention relates to an aqueous dispersion of multistage polymeric particles and a process for preparing the same.

INTRODUCTION

Aqueous or waterborne coating compositions are widely used in industrial and architectural applications as they contribute less volatile organic compounds (VOCs) than solvent-borne coating compositions, but they still suffer from limitations such as insufficient water resistance and chemical resistance such as resistance to alcohol, acetic acid, and alkali. Particularly, it is challenging for waterborne coating compositions to provide coatings made therefrom with hot water resistance. For example, some applications such as coatings for kitchen furniture and dining tables require coatings' resistance to damages after exposure to hot water (that is, water at 70 degrees Celsius (° C.)) or higher), particularly, boiling water.

Therefore, it is desirable to provide an aqueous polymer dispersion, particularly suitable for use in coating applications that can provide coatings with resistance to hot water while achieving above good chemical resistance to alcohol, acetic acid, and alkali.

SUMMARY OF THE INVENTION

The present invention provides a novel aqueous dispersion of multistage polymeric particles that is particularly suitable for coating applications. A coating composition comprising such aqueous dispersion of multistage polymeric particles provides coatings made therefrom with excellent hot resistance with a rating of 3 or higher while achieving good chemical resistance including alcohol resistance rated as 4 or higher, alkali resistance rated as 3 or higher, and acetic acid resistance rated as 3 or higher. These properties may be measured according to the test methods described in the Examples section below.

In a first aspect, the present invention is an aqueous dispersion of multistage polymeric particles, wherein the multistage polymeric particles comprise, by weight based on the weight of the multistage polymeric particles, from 30% to 60% of a polymer A and from 40% to 70% of a polymer B, wherein the polymer A has a higher glass transition temperature than the polymer B;

wherein the multistage polymeric particles comprising, by weight based on the weight of the multistage polymeric particles, from 2% to 15% of structural units of an acetoacetamide functional monomer having the structure of formula (I):

(I)

wherein $R_1$ is selected from the following structure:

(II-a)

(II-b)

(II-c)

(II-d)

(II-e)

where $R_2$, $R_4$, $R_8$, $R_{10}$, $R_{12}$ and $R_{13}$ are each independently an alkylene group having 2 to 20 carbon atoms; $R_3$, $R_5$, $R_6$, $R_7$ and $R_{11}$ are each independently hydrogen or an alkyl group having from 1 to 8 carbon atoms; $R_9$ is hydrogen or an alkyl group having 1 to 20 carbon atoms; and X is O or N;

from 0.1% to 10% of structural units of a monoethylenically unsaturated acid monomer, a salt thereof, or mixtures thereof;

structural units of a multiethylenically unsaturated monomer; and structural units of a monoethylenically unsaturated nonionic monomer.

In a second aspect, the present invention is a process for preparing the aqueous dispersion of multistage polymeric particles of the first aspect, by multistage free-radical polymerization, comprising at least one stage of polymerization forming the polymer A and at least one stage of polymerization forming the polymer B.

In a third aspect, the present invention is a coating composition comprising the aqueous dispersion of the first aspect.

DETAILED DESCRIPTION OF THE INVENTION

"Acrylic" in the present invention includes (meth)acrylic acid, alkyl (meth)acrylate, (meth)acrylamide, (meth)acrylonitrile and their modified forms such as hydroxyalkyl (meth)acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

As used herein, the term structural units, also known as polymerized units, of the named monomer refers to the remnant of the monomer after polymerization, or the monomer in polymerized form. For example, a structural unit of methyl methacrylate is as illustrated:

where the dotted lines represent the points of attachment of the structural unit to the polymer backbone.

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

"Glass transition temperature" ($T_g$) in the present invention can be measured by various techniques including, for example, differential scanning calorimetry (DSC) or calculation by using a Fox equation (T.G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$; all temperatures being in K. The glass transition temperatures of the homopolymers may be found, for example, in "Polymer Handbook", edited by J. Brandrup and E. H. Immergut, Interscience Publishers. Fox Tgs of homopolymers of some commonly used monomer are summarized in the following table:

| Monomer | Tg of homopolymer (° C.) |
| --- | --- |
| Methyl methacrylate | 105 |
| Butyl acrylate | −54 |
| 2-Ethylhexyl acrylate | −85 |
| Styrene | 100 |
| Methacrylic acid | 185 |
| Allyl methacrylate | 94* |
| Acetoacetoxyethyl methacrylate | 7 |
| Acetoacetamidoethyl methacrylate | 12 |

*A thesis submitted to the Graduate School of Natural and Applied Sciences of Middle East Technical University, Tugba Vardareli, Polymerization and Characterization of Allyl Methacrylate, 2006

"Multistage polymeric particles" herein means polymeric particles prepared by the sequential addition of two or more different monomer compositions, comprising at least two polymers including a polymer A and a polymer B. By "polymer A" (also as "first stage polymer") and "polymer B" (also as "the second stage polymer") mean these polymers having different compositions and formed in different stages of multistage free-radical polymerization in preparing the multistage polymeric particles.

The polymer A and/or the polymer B in the multistage polymeric particles, preferably the polymer A, may each independently comprise structural units of one or more monoethylenically unsaturated acid monomer, a salt thereof, or mixtures thereof. The monoethylenically unsaturated acid monomer and/or salt thereof can be an $\alpha$, $\beta$-ethylenically unsaturated carboxylic acid, monomers bearing an acid-forming group which yields or is subsequently convertible to, such an acid group (such as anhydride, (meth)acrylic anhydride, or maleic anhydride); a phosphorous-containing acid monomer or a salt thereof, a sulfonic acid monomer and a salt thereof, or mixtures thereof. Suitable $\alpha$, $\beta$-ethylenically unsaturated carboxylic acids may include, for example, methacrylic acid, acrylic acid, 2-carboxyethyl (meth)acrylate, maleic acid, crotonic acid, acyloxypropionic acid, fumaric acid, itaconic acid, or mixtures thereof. Phosphorous-containing acid monomers can be ethylenically unsaturated phosphorous acid-containing monomers including, for example, dihydrogen phosphate esters of an alcohol in which the alcohol contains or is substituted with a polymerizable vinyl or olefinic group. Suitable phosphorous acid-containing monomers and salts thereof may include, for example, phosphoalkyl (meth)acrylates such as phosphoethyl (meth)acrylate, phosphopropyl (meth)acrylate, phosphobutyl (meth)acrylate, salts of phosphoalkyl (meth)acrylates, or mixtures thereof; $CH_2$=C(R)—C(O)—O—($R_pO$)$_n$—P(O)(OH)$_2$, wherein R=H or $CH_3$ and $R_p$=alkyl, n is from 1 to 20, such as SIPOMER PAM-100, SIPOMER PAM-200, SIPOMER PAM-300, and SIPOMER PAM-4000 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, allyl ether phosphate, salts thereof, or mixtures thereof. Sulfonic acid monomers and salts thereof may include sodium vinyl sulfonate (SVS), sodium styrene sulfonate (SSS), acrylamido-methyl-propane sulfonate (AMPS), or mixtures thereof. Preferred monoethylenically unsaturated acid monomers include methacrylic acid. The multistage polymeric particles may comprise structural units of the monoethylenically unsaturated acid monomer and salt thereof in a total amount of 0.1% or more, 0.4% or more, 0.7% or more, 1.0% or more, 1.3% or more, 1.6% or more, 1.8% or more, 2.0% or more, 2.2% or more, 2.4% or more, 2.6% or more, or even 2.8% or more, and at the same time, 10% or less, 7% or less, 5% or less, 4.5% or less, 4.2% or less, 4.0% or less, 3.8% or less, 3.6% or less, 3.4% or less, 3.2% or less, or even 3.0% or less, by weight based on the weight of the multistage polymeric particles. The polymer A in the multistage polymeric particles may comprise structural units of the monoethylenically unsaturated acid monomer and salt thereof in an amount of 0.1% or more, 0.4% or more, 0.7% or more, 1.0% or more, 1.3% or more, 1.6% or more, 1.8% or more, 2.0% or more, 2.2% or more, 2.4% or more, 2.6% or more, or even 2.8% or more, and at the same time, 5% or less, 4.5% or less, 4.2% or less, 4.0% or less, 3.8% or less, 3.6% or less, 3.4% or less, 3.2% or less, or even 3.0% or less, by weight based on the weight of the polymer A. The polymer B in the multistage polymeric particles may comprise structural units of the monoethylenically unsaturated acid monomer and salt thereof in an amount of 2.0% or more, 2.2% or more, 2.4% or more, 2.6% or more, or even 2.8% or more, and at the same time, 15% or less, 10% or less, 7% or less, 5% or less, 4.5% or less, 4.2% or less, 4.0% or less, 3.8% or less, 3.6% or less, 3.4% or less, 3.2% or less, or even 3.0% or less, by weight based on the weight of the polymer B.

The polymer A and/or the polymer B in the multistage polymeric particles, preferably the polymer B, may each independently comprise structural units of one or more acetoacetamide functional monomer. The acetoacetamide functional monomer refers to a monomer containing at least one acetoacetamide group. The acetoacetamide functional monomer useful in the present invention may have the structure of formula (I):

(I)

wherein $R_1$ is selected from the following structure:

(II-a)

(II-b)

(II-c)

(II-d)

(II-e)

where $R_2$, $R_4$, $R_8$, $R_{10}$, $R_{12}$ and $R_{13}$ are each independently an alkylene group, having 2 to 20 carbon atoms, from 3 to 12 carbon atoms, or from 4 to 8 carbon atoms, such as ethylene group ($—CH_2CH_2—$) and propylene group ($—CH_2CH_2CH_2—$); $R_3$, $R_5$, $R_6$, $R_7$, and $R_{11}$ are each independently hydrogen (H) or an alkyl group having from 1 to 8 carbon atoms or from 2 to 4 carbon atoms, such as methyl and ethyl; $R_9$ is H or an alkyl group having 1 to 20 carbon atoms, from 3 to 12 carbon atoms, or from 4 to 8 carbon atoms; and X is O or N. Preferably, $R_1$ has the structure of (II-a), wherein X is O, $R_2$ is $—CH_2CH_2—$, and $R_3$ is $—CH_3$. "Alkyl" refers to a monovalent hydrocarbon group, such as methyl. "Alkylene" refers to a bivalent saturated aliphatic radical such as $—CH_2CH_2—$.

The ethylenically unsaturated acetoacetamide functional monomer can be an acetoacetamidoalkyl (meth)acrylate. Examples of suitable ethylenically unsaturated acetoacetamide functional monomers include acetoacetamidoethyl methacrylate (N-AAEM), acetoacetamidoethyl acrylate, acetoacetamidoethyl (meth)acrylamide, acetoacetamidoethyl maleate, acetoacetamidoethyl itaconate, or mixtures thereof. Preferably, the ethylenically unsaturated acetoacetamide functional monomer is acetoacetamidoethyl methacrylate.

The ethylenically unsaturated acetoacetamide functional monomer useful in the present invention may be synthesized by reacting N-(2-hydroxyethyl) acetoacetamide with the monoethylenically unsaturated acid and/or the anhydride thereof described above, an alkyl ester of (meth)acrylic acid, or mixtures thereof, through esterification or transesterification reaction. The alkyl ester of (meth)acrylic acid are as described below. Preferably, the anhydride of the monoethylenically unsaturated acid is used. More preferably, (meth) acrylate anhydride is used.

The polymer A in the multistage polymeric particles may comprise structural units of the acetoacetamide functional monomer in an amount of zero or more, 0.1% or more, 0.2% or more, 0.3% or more, or even 0.5% or more, and at the same time, 15% or less, 10% or less, 7% or less, 5% or less, 4% or less, 3% or less, 2% or less, 1.5% or less, 1.1% or less, or even 1% or less, by weight based on the weight of the polymer A. The polymer B may comprise structural units of the acetoacetamide functional monomer in an amount of 2.8% or more, 3.0% or more, 3.2% or more, 3.5% or more, 3.8% or more, 4% or more, 4.2% or more, 4.5% or more, 4.8% or more, or even 5% or more, at the same time, 30% or less, 25% or less, 20% or less, 15% or less, 14% or less, 13% or less, 12% or less, 11% or less, 10% or less, 9% or less, 8% or less, 7% or less, or even 6% or less, by weight based on the weight of the polymer B. Structural units of the acetoacetamide functional monomer may be present in the polymer A, polymer B, or in both the polymer A and polymer B; with the proviso that structural units of the acetoacetamide functional monomer in the multistage polymeric particles are present in a total amount of 2% or more, 2.1% or more, 2.5% or more, 2.8% or more, 3.0% or more, 3.1% or more, 3.3% or more, 3.5% or more, 3.7% or more, 4.0% or more, 4.2% or more, 4.5% or more, or even 4.7% or more, and at the same time, 15% or less, 12% or less, 10% or less, 9% or less, 8% or less, 7% or less, 6% or less, or even 5% or less, by weight based on the weight of the multistage polymeric particles.

The polymer A and/or the polymer B in the multistage polymeric particles, preferably the polymer A, may each independently comprise structural units of one or more multiethylenically unsaturated monomer including di-, tri-, tetra-, or higher multifunctional ethylenically unsaturated monomers. Preferably, the multiethylenically unsaturated monomer contains two or more different ethylenically unsaturated polymerizable groups. The two or more different ethylenically unsaturated polymerizable groups usually have different reactivity. Each of the ethylenically unsaturated polymerizable groups may be selected from one of but different categories (i), (ii), (iii) and (iv): (i) an acryl group, (ii) a methacryl group, (iii) an allyl group ($H_2C=CH—CH_2—$), and (iv) an additional ethylenically unsaturated group that is other than (i), (ii), and (iii). The acryl group may be an acryloxy group or an acrylamino group. The methacryl group may include a methacryloxy group or a methacrylamino group. The additional ethylenically unsaturated group may include a vinyl group, a maleate group, a crotyl group, or a dicyclopentenyl group. More preferably, the multiethylenically unsaturated monomer contains at least one allyl group and at least one acryl or methacryl group. Suitable multiethylenically unsaturated monomers may include, for example, divinylbenzene (DVB), allyl (meth)acrylate, 2-methylallyl (meth)acrylate, allyl (meth) acrylamide, 2-methylallyl (meth)acrylamide, allyl oxyethyl (meth)acrylate, 2-methylallyl oxyethyl (meth)acrylate, crotyl (meth)acrylate, dicyclopentenyl (meth)acrylate, dicyclopentenyl ethyl (meth)acrylate, diallyl maleate, or mixtures thereof. The multistage polymeric particles may comprise structural units of the multiethylenically unsaturated monomer in a total amount of greater than 0.1%, for example, 0.3% or more, 0.5% or more, 0.7% or more, 0.9% or more, 1.1% or more, 1.3% or more, 1.5% or more, 1.7% or more, 1.9% or more, 2.1% or more, 2.3% or more, or even 2.5% or more, and at the same time, 7% or less, 5% or less, 4.8% or less, 4.6% or less, 4.4% or less, 4.2% or less, 4% or less, 3.8% or less, 3.6% or less, 3.4% or less, 3.2% or less, 3.0% or less, or even 2.8% or less, by weight based on the weight of the multistage polymeric particles. The polymer A may comprise structural units of the multiethylenically unsaturated monomer in an amount of 0.1% or more, 0.5% or more, 1.0% or more, 1.4% or more, 1.8% or more, 2.2% or more, 2.5% or more, 2.8% or more, 3.1% or more, 3.4% or more, 3.7% or more, 4.0% or more, 4.3% or more, or even 4.5% or more, and at the same time, 12% or less, 11% or less, 10% or less, 9% or less, 8% or less, 7% or less, 6.5% or less, 6% or less, 5.5% or less, or even 5% or less, by weight based on the weight of the polymer A. The polymer B may comprise structural units of the multiethylenically unsaturated monomer in an amount of from zero to 1.0%, for example, less than 0.8%, less than 0.5%, less than 0.3%, less than 0.2%, less than 0.1%, less than 0.08%, less than 0.05%, less than 0.04%, less than 0.02%, less than 0.01%, or even zero, by weight based on the weight of the polymer B. The contents of structural units of the multiethylenically unsaturated monomer in the polymer A and polymer B can be the same or different. Preferably, the content of structural units of the multiethylenically unsaturated monomer in the polymer A is higher than that of the polymer B.

The multistage polymeric particles of the present invention may also comprise structural units of one or more monoethylenically unsaturated nonionic monomer that is other than the acetoacetamide functional monomer. The structural units of the monoethylenically unsaturated nonionic monomer may be present in the polymer A, the polymer B, or in both the polymer A and B. As used herein, the term "nonionic monomer" refers to a monomer that does not bear an ionic charge between pH=1-14. The monoethylenically unsaturated nonionic monomer may comprise any one or any combination of more than one type of monomer selected from alkyl esters of (meth)acrylic acids, vinyl aromatic monomers such as styrene and substituted styrene, vinyl esters of carboxylic acid, (meth)acrylamide, ethylenically unsaturated nitriles such as (meth)acrylonitrile, (meth) acryl functional silanes such as (meth)acryloxyalkyltrialkoxysilanes, vinyl silanes such as vinyltrialkoxysilanes, or mixtures thereof. Alkyl esters of (meth)acrylic acids useful in the present invention can be $C_1$-$C_{20}$-, $C_1$-$C_{10}$-, or $C_1$-$C_8$- alkyl esters of (meth)acrylic acids including, for example, methyl acrylate, methyl methacrylate, ethyl acrylate, butyl acrylate, butyl methacrylate, 2-ethylhexyl acrylate, iso-butyl (meth)acrylate, hexyl (meth)acrylate, lauryl (meth)acrylate, stearyl (meth)acrylate, cyclohexyl (meth)acrylate, benzyl (meth)acrylate, oleyl(meth)acrylate, palmityl (meth)acrylate, nonyl(meth)acrylate, decyl (meth)acrylate, dodecyl (meth)acrylate, pentadecyl (meth) acrylate, hexadecyl (meth)acrylate, octadecyl (meth)acrylate, hydroxyethyl (meth)acrylate, or hydroxypropyl (meth)acrylate, or mixtures thereof. The vinyl silanes useful in the present invention may comprise any one or any combination of more than one type of monomer selected from alkylvinyldialkoxysilanes, vinyltriethoxysilane, vinyltrimethoxysilane, or mixtures thereof. The (meth)acryl functional silanes useful in the present invention may comprise any one or any combination of more than one type of monomer selected from gamma-methacryloxypropyltrimethoxysilane, methacryloxypropyltriethoxysilane, 3-methacryloxypropylmethyldimethoxy silane, 3-methacryloxypropyltrimethoxy silane, 3-methacryloxypropyltriethoxy silane, or mixtures thereof. Preferably, the monoethylenically unsaturated nonionic monomer is selected from the group consisting of methyl methacrylate, methacrylate, ethyl acrylate, butyl methacrylate, butyl acrylate, 2-ethylhexyl acrylate, styrene, or mixtures thereof. The multistage polymeric particles may comprise structural units of the monoethylenically unsaturated nonionic monomer in a total amount of 70% or more, 75% or more, 80% or more, 82% or more, 85% or more, 87% or more, or even 88% or more, and at the same time, 92.9% or less, 92% or less, 91% or less, 90% or less, or even 89% or less, by weight based on the weight of the multistage polymeric particles.

Preferably, the polymer A in the multistage polymeric particles comprises structural units of the monoethylenically unsaturated acid monomer and/or salt thereof, structural units of the multiethylenically unsaturated monomer such as allyl methacrylate, structural units of the monoethylenically unsaturated nonionic monomer, and optionally, structural units of the acetoacetamide functional monomer. More preferably, the polymer A comprises, by weight based on the weight of the polymer A, from 1% to 5% of structural units of the monoethylenically unsaturated acid monomer and salt thereof, from 1% to 6% of structural units of the multiethylenically unsaturated monomer, from 84% to 98% of structural units of the monoethylenically unsaturated nonionic monomer, and from 1% to 5% of structural units of the acetoacetamide functional monomer. Preferably, the polymer B in the multistage polymeric particles comprises structural units of the monoethylenically unsaturated acid monomer and/or salt thereof, structural units of the monoethylenically unsaturated nonionic monomer, and structural units of the acetoacetamide functional monomer. More preferably, the polymer B comprises, by weight based on the weight of the polymer B, from 1% to 10% of structural units of the monoethylenically unsaturated acid monomer and salt thereof, from 78% to 92% of structural units of the monoethylenically unsaturated nonionic monomer, and from 5% to 12% of structural units of the acetoacetamide functional monomer. The multistage polymeric particles of the present invention may comprise, by weight based on the weight of the multistage polymeric particles, from 2% to 8% of structural units of the monoethylenically unsaturated acid monomer and salt thereof, from 2% to 8% of structural units of the acetoacetamide functional monomer, from 0.5% to 5% of structural units of the multiethylenically unsaturated monomer, and from 79% to 95.5% of structural units of the monoethylenically unsaturated nonionic monomer.

The multistage polymeric particles of the present invention comprise the polymer A and the polymer B. The polymer A in the multistage polymeric particles may be present in an amount of 30% or more, 32% or more, 34% or more, 36% or more, 38% or more, 39% or more, 40% or more, 41% or more, 42% or more, 43% or more, 44% or more, or even 45% or more, and at the same time, 60% or less, 59% or less, 58% or less, 57% or less, 56% or less, 55% or less, 54% or less, 53% or less, 52% or less, 51% or less, or even 50% or less, by weight based on the weight of the multistage polymeric particles. The polymer B in the multistage polymeric particles may be present in an amount of 40% or more, 41% or more, 42% or more, 43% or more, 44% or more, 45% or more, 46% or more, 47% or more, 48% or more, 49% or more, or even 50% or more, and at the same time, 70% or less, 68% or less, 66% or less, 64% or less, 62% or less, 61% or less, 60% or less, 59% or less, 58% or less, 57% or less, 56% or less, or even 55% or less, by weight based on the weight of the multistage polymeric particles. The multistage polymeric particles can be two-stage polymeric particles, where the total weight concentration of the polymer A and the polymer B in the multistage polymeric particles is equal to 100%. The multistage polymeric particles of the present invention may comprise multiple different phases or layers, which are formed by at least the polymer A and the polymer B. The multistage polymeric particles may comprise two layers such as an inner layer of the polymer A and an outer layer of the polymer B.

Types and levels of the monomers described above may be chosen to provide the multistage polymeric particles with a Tg suitable for different applications. The multistage polymeric particles may have a Tg of −10° C. or more, −5° C. or more, 0° C. or more, 5° C. or more, 10° C. or more, 14° C. or more, 18° C. or more, or even 22° C. or more, and at the same time, 80° C. or less, 70° C. or less, 65° C. or less, 60° C. or less, 55° C. or less, 50° C. or less, 45° C. or less, 40° C. or less, 35° C. or less, or even 30° C. or less. In the multistage polymeric particles, the polymer A has higher Tg than the polymer B, for example, 20° C. or higher, 30° C. or higher, or even 40° C. or higher than that of the polymer B. For example, the polymer A may have a Tg of greater than 30° C. or more, for example, 33° C. or more, 36° C. or more, 39° C. or more, 42° C. or more, 45° C. or more, 48° C. or more, 50° C. or more, 51° C. or more, or even 52° C. or more, and at the same time, 110° C. or less, 100° C. or less, 90° C. or less, 85° C. or less, 80° C. or less, 75° C. or less, 72° C. or less, 70° C. or less, 68° C. or less, 67° C. or less, 65° C. or less, 62° C. or less, or even 60° C. or less. The polymer B may have a Tg of 30° C. or less, for example, 25° C. or less, 21° C. or less, 17° C. or less, 13° C. or less, 9° C. or less, 6° C. or less, 3° C. or less, 0° C. or less, −3° C. or less, −6° C. or less, −8° C. or less, or even −10° C. or less, and at the same time, −40° C. or more, −35° C. or more, −30° C. or more, −25° C. or more, −22° C. or more, −19° C. or more, −17° C. or more, −15° C. or more, or even −13° C. or more. Tgs are calculated by the Fox equation described above.

The multistage polymeric particles in the aqueous dispersion of the present invention may have an average particle size of 50 nanometers (nm) or more, 80 nm or more, 90 nm or more, 100 nm or more, and at the same time, 500 nm or less, 300 nm or less, 200 nm or less, or even 150 nm or less. The particle size herein refers to the number average particle size and may be measured by a Brookhaven BI-90 Plus Particle Size Analyzer.

In addition to the multistage polymeric particles, the aqueous dispersion of the present invention may further comprise one or more polyfunctional carboxylic hydrazide containing at least two hydrazide groups per molecule. The polyfunctional carboxylic hydrazide may act as a crosslinker and may be selected from the group consisting of adipic dihydrazide, oxalic dihydrazide, isophthalic dihydrazide, polyacrylic polyhydrazides, or mixtures thereof. The polyfunctional carboxylic hydrazide may be present in an amount of zero or more, 0.05% or more, 0.1% or more, 0.2% or more, or even 0.5% or more, and at the same time, 10% or less, 7% or less, 5% or less, 2% or less, or even 1% or less, by weight based on the weight of the multistage polymeric particles.

The aqueous dispersion of multistage polymeric particles of the present invention further comprises water. Water may be present in an amount of 30% or more, 40% or more, or even 50% or more, and at the same time, 90% or less, 85% or less, or even 80% or less, by weight based on the total weight of the aqueous dispersion.

The present invention also relates to a process for preparing the aqueous dispersion comprising the multistage polymeric particles by multistage free-radical polymerization, comprising at least one stage of polymerization forming the polymer A and at least one stage of polymerization forming the polymer B. In the multistage free-radical polymerization, at least two stages are formed sequentially, which usually results in the formation of the multistage polymeric particles comprising at least two polymer compositions such as the polymer A and the polymer B, optionally different stages can be formed in different reactors. Each of the stages is sequentially polymerized and different from the immediately preceding and/or immediately subsequent stage by a difference in monomer composition. The multistage free-radical polymerization may include at least one stage of forming the polymer A by polymerization of a monomer mixture A in the first stage, followed by forming the polymer B by polymerization of a monomer mixture B in the second stage in the presence of the polymer A obtained from the first stage. Alternatively, the multistage free-radical polymerization may include forming the polymer B by polymerization of the monomer mixture B in the first stage, followed by forming the polymer A by polymerization of the monomer mixture A in the second stage in the presence of the previously formed polymer B. Each stage of the free-radical polymerization can be conducted by polymerization techniques well known in the art such as suspension polymerization or emulsion polymerization of monomers such as the monomer mixtures A and B. Emulsion polymerization is a preferred process. The monomer mixture A and the monomer mixture B may each independently include the monomers described above for forming the structural units of the polymer A and the polymer B, respectively. Total weight concentration of the monomers in the monomer mixture A for preparing the polymer A is equal to 100%. Total weight concentration of the monomers in the monomer mixture B is equal to 100%. For each monomer, the weight concentration of a monomer in total monomers used in preparing a polymer (e.g., the polymer A) is substantially the same as the above described weight concentration of structural units of such monomer in such polymer (e.g., the polymer A) as described above, for example, the weight concentration of each monomer in the monomer mixture A (that is, based on the total weight of the monomer mixture A) are the same as the weight concentration of structural units of such monomer in the polymer A (that is, based on the weight of the polymer A). The monomer mixtures A and B for preparing the polymer A and the polymer B, respectively, may be added neat or as an emulsion in water; or added in one or more addition or continuously, linearly or nonlinearly, over the reaction period of preparing the polymer A, the polymer B, respectively, or combinations thereof. Temperature suitable for emulsion polymerization processes may be lower than 100° C., in the range of from 10 to 95° C., in the range of from 30 to 90° C., or in the range of from 50 to 88° C.

In the multistage free-radical polymerization process for preparing the aqueous dispersion of the multistage polymeric particles, one or more free radical initiator may be used in each stage. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers used for preparing the multistage polymer. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the multistage free-radical polymerization process for preparing the aqueous dispersion of the multistage polymeric particles, one or more surfactant may be used in one or more stage of the polymerization process. The surfactant may be added prior to or during the polymerization of the monomers, or combinations thereof. A portion of the surfactant can also be added after the polymerization. Surfactants may be used for at least one stage or all stages of preparing the multistage polymeric particles. The surfactants may include anionic and/or nonionic emulsifiers. The surfactants can be reactive surfactants such as polymerizable surfactants. Examples of suitable surfactants include alkali metal or ammonium salts of alkyl, aryl, or alkylaryl sulfates, sulfonates or phosphates; alkyl sulfonic acids; sulfosuccinate salts; fatty acids; and ethoxylated alcohols or phenols. Preferably, the alkali metal or ammonium salts of alkyl, aryl, or alkylaryl sulfates surfactant are used. The combined amount of the surfactant used is usually from zero to 10% or from 0.5% to 3%, by weight based on the weight of total monomers used for preparing the multistage polymer.

In the multistage free-radical polymerization process for preparing the aqueous dispersion of the multistage polymeric particles, one or more chain transfer agent may be used in one or more stage of the polymerization process. Examples of suitable chain transfer agents include 3-mercaptopropionic acid, methyl mercaptopropionate, butyl mercaptopropionate, n-dodecyl mercaptan, benzenethiol, azelaic alkyl mercaptan, or mixtures thereof. The chain transfer agent may be used in an effective amount to control the molecular weight of polymers in the multistage polymeric particles, for example, the train transfer agent can be used in the polymerization stage of forming the polymer A, the polymerization stage of forming the polymer B, or in both stages. The chain transfer agent may be used in an amount of zero or more, or more, 0.15% or more, or even 0.2% or more, and at the same time, 2% or less, 1% or less, 0.5% or less, or even 0.3% or less, by weight based on the total weight of monomers used for preparing the multistage polymeric particles.

The obtained aqueous dispersion of the multistage polymeric particles may be neutralized to a pH value of at least 5, for example, from 5 to 12, from 6 to 11, from 6.5 to 10, or from 7 to 9. Neutralization may be conducted by adding one or more base which may lead to partial or complete neutralization of the ionic or latently ionic groups of the multistage polymer. Examples of suitable bases include ammonia; alkali metal or alkaline earth metal compounds such as sodium hydroxide, potassium hydroxide, calcium hydroxide, zinc oxide, sodium carbonate; primary, secondary, and tertiary monoamines including propylamine, monobutylamine, hexylamine, diethanolamine, triethanolamine, dimethylethanolamine, diethyl amine, dimethoxyethylamine, triethyl amine, tributylamine, 2-ethoxyethylamine, morpholine, and polyether amines for example, JEFFAMINE M-600; primary diamines, secondary diamines, primary triamines, secondary triamines, including 2-diethylaminoethylamine, 1,2-propylenediamine, neopentanediamine, hexamethylenediamine, 4,9-dioxadodecane-1, 12-diamine, and polyether amines selected from the group consisting of primary diamines and/or primary triamines and secondary diamines and/or secondary triamines having a polyethylene glycol or polypropylene glycol backbone, for example, JEFFAMINE D-230, JEFFAMINE ED-600, JEFFAMINE EDR-148, JEFFAMINE T403, JEFFAMINE SD401, or mixtures thereof.

The process of preparing the aqueous dispersion of the present invention may further comprise adding the polyfunctional carboxylic hydrazide containing at least two hydrazide groups per molecule described above to the aqueous dispersion.

The aqueous dispersion of the multistage polymeric particles of the present invention demonstrates good film formation property with a minimum film formation temperature (MFFT) of greater than 0° C., for example, 10° C. or more, 15° C. or more, 20° C. or more, 25° C. or more, ° C. or more, 35° C. or more, 40° C. or more, or even 45° C. or more, and at the same time, ° C. or less, 70° C. or less, 65° C. or less, 60° C. or less, or even 55° C. or less. The MFFT is the lowest temperature at which the polymer particles of the aqueous dispersion will mutually coalesce and form a continuous film when the volatile component (for example, water) evaporates. The MFFT can be determined according to the test method described in the Examples section below. The aqueous dispersion of multistage polymeric particles is useful in many applications including, for example, wood coatings, metal coatings, architecture coatings, and traffic paints.

The present invention also relates to a coating composition comprising the aqueous dispersion of multistage polymeric particles. The coating composition may also comprise one or more pigment. Pigments may include particulate inorganic materials which are capable of materially contributing to the opacity or hiding capability of a coating. Such materials typically have a refractive index greater than 1.8. Examples of suitable pigments include titanium dioxide (TiO$_2$), zinc oxide, zinc sulfide, iron oxide, barium sulfate, barium carbonate, or mixtures thereof. The coating composition may comprise one or more extender. Extenders may include particulate inorganic materials typically having a refractive index of less than or equal to 1.8 and greater than 1.5. Examples of suitable extenders include calcium carbonate, aluminum oxide (Al$_2$O$_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The pigments and/or extenders may be present in an amount of zero or more, 5% or more, 10% or more, or even 15% or more, and at the same time, 40% or less, 30% or less, 25% or less, or even 20% or less, by weight based on the total weight of the coating composition.

The coating composition of the present invention may comprise one or more defoamer. "Defoamer" herein refers to a chemical additive that reduces and hinders the formation of foam. Defoamers may be silicone-based defoamers, mineral oil-based defoamers, ethylene oxide/propylene oxide-based defoamers, alkyl polyacrylates, or mixtures thereof. The defoamer may be present in an amount of zero or more, 0.01% or more, or even 0.1% or more, and at the same time, 2% or less, 1.5% or less, or even 1% or less, by weight based on the total weight of the coating composition.

The coating composition of the present invention may comprise one or more thickener (also known as "rheology modifier"). Thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferred thickener is based on HEUR. The thickener may be present in an amount of zero or more, 0.01% or more, or even 0.1% or more, and at the same time, 5% or less, 4% or less, or even 3% or less, by weight based on the total weight of the coating composition.

The coating composition of the present invention may comprise one or more wetting agent. "Wetting agent" herein refer to a chemical additive that reduces the surface tension of a coating composition, causing the coating composition to more easily spread across or penetrate the surface of a substrate. Wetting agents may be polycarboxylates, anionic, zwitterionic, or non-ionic. The wetting agent may be present in an amount of zero or more, 0.01% or more, or even 0.1% or more, and at the same time, 5% or less, 4% or less, or even 3% or less, by weight based on the total weight of the coating composition.

The coating composition of the present invention may comprise one or more coalescent. "Coalescent" herein refer to a slow-evaporating solvent that fuses polymer particles into a continuous film under ambient condition. Suitable coalescents may include, for example, 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescent may be present in an amount of zero or more, 0.1% or more, or even 1% or more, and at the same time, 12% or less, 10% or less, or even 9% or less, by weight based on the total weight of the coating composition.

In addition to the components described above, the coating composition of the present invention may further comprise any one or any combination of more than one type of the following additives: buffers, neutralizers, dispersants, humectants, biocides, anti-skinning agents, colorants, flowing agents, anti-oxidants, plasticizers, freeze/thaw additives, leveling agents, thixotropic agents, adhesion promoters, anti-scratch additives, and grind vehicles. These additives may be present in a combined amount of zero or more, 0.001% or more, or even 0.1% or more, and at the same time, 5% or less, 3% or less, or even 2% or less, by weight based on the total weight of the coating composition.

The coating composition of the present invention may be prepared with techniques known in the coating art, for example, by admixing the aqueous dispersion comprising the multistage polymeric particles with other optional components described above. Components in the coating composition may be mixed in any order to provide the coating composition of the present invention. Any of the above-mentioned optional components may also be added to the composition during or prior to the mixing to form the coating composition. The coating composition of the present invention is typically an aqueous coating composition, for example, a one-component waterborne wood coating composition.

The present invention also provides a method of preparing a coating. The method may comprise: forming the coating composition, applying the coating composition to a substrate, and drying, or allowing to dry, the applied coating composition to form the coating. The coating composition can be applied to a substrate by incumbent means including brushing, dipping, rolling and spraying. The coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition has been applied to a substrate, the coating composition can dry, or allow to dry, to form a film (this is, coating) at room temperature (20-25° C.), or at an elevated temperature, for example, from 35 to The coating composition can provide the coating obtained therefrom (that is, the film obtained after drying, or allowing to dry, the coating composition applied to a substrate) and the coated substrate with excellent resistance to hot water at 70° C. or more, at 80° C. or more, or at temperatures between 90 and 100° C., with rating of 3 or more or even 4 or more. The coating and the coated substrate can also demonstrate alcohol resistance (48% aqueous ethanol solution, 1 hour) with rating of 4 or more, alkali resistance (10% aqueous sodium carbonate solution, 16 hours) with rating of 3 or more or even 4 or more, and acetic acid resistance (10% aqueous glacial acetic acid solution, 16 hours) with rating of 4 or more. These properties may be measured according to the test methods described in the Examples section below.

The coating composition of the present invention can be applied to, and adhered to, various substrates. Examples of suitable substrates include concrete, cementious substrates, wood, metals, stones, elastomeric substrates, glass or fabrics; preferably, wood. The coating composition is suitable for various coating applications, such as architecture coatings, marine and protective coatings, automotive coatings, wood coatings including furniture coatings, joinery coatings, and floor coatings, coil coatings, traffic paints, and civil engineering coatings. The coating composition can be used alone, or in combination with other coatings to form multi-layer coatings.

EXAMPLES

Some embodiments of the invention will now be described in the following Examples, wherein all parts and percentages are by weight unless otherwise specified. The materials used in the examples and their abbreviations are given as below:

Methacrylic acid (MAA), methyl methacrylate (MMA), styrene (ST), 2-ethylhexyl acrylate (2-EHA) and allyl methacrylate (ALMA) are all available from Sinoreagent Group.

DOWANOL™ DPnB (dipropylene glycol n-butyl ether) and DOWANOL DPM (dipropylene glycol methyl ether), and DOWANOL EB (ethylene glycol monobutyl ether), available from The Dow Chemical Company, are used as coalescents.

Tego Airex 902w defoamer is available from Evonik.

BYK-346 polyether modified siloxane, available from BYK, is used as a wetting agent.

Acetoacetoxyethyl methacrylate (AAEM), and ACRYSOL™ RM-8W and ACRYSOL RM-5000 nonionic urethane rheology modifiers are all available from The Dow Chemical Company.

ACRYSOL and DOWANOL are trademarks of The Dow Chemical Company.

The following standard analytical equipment and methods are used in the Examples and in determining the properties and characteristics stated herein:

MFFT Measurement

MFFT was measured using a Coesfeld MFFT instrument by casting a 75 μm wet film of an aqueous dispersion sample on a heating plate with gradient temperature. The film was dried and the minimum temperature at which a coherent film formed is recorded as the MFFT.

Particle Size Measurement

The particle size of polymer particles in an aqueous dispersion was measured by using Brookhaven BI-90 Plus Particle Size Analyzer, which employs the technique of photon correlation spectroscopy (light scatter of sample particles). This method involved diluting 2 drops of an aqueous dispersion to be tested in 20 mL of 0.01 M sodium chloride (NaCl) solution, and further diluting the resulting mixture in a sample cuvette to achieve a desired count rate (K) (e.g., K ranging from 250 to 500 counts/sec for diameter in the range of 10-300 nm). Then the particle size of the aqueous polymer dispersion was measured and reported as a Z-average diameter by intensity.

Heat-Age Stability Test

A diamine such as Jeffamine D-230 (Huntsman Corporation) was post added into an aqueous polymer dispersion sample to form a mixture. The viscosity of the mixture was measured and recorded as the Initial Viscosity. The heat-age stability of the aqueous polymer dispersion with the diamine was measured by storing the mixture in an oven at 50° C. and monitoring viscosity changes regularly. After 7 days, the viscosity of the mixture was measured and recorded as Final Viscosity. If Final Viscosity is less than 3 times of Initial Viscosity, the aqueous polymer dispersion passes the heat-age stability test. Otherwise, if the Final Viscosity is equal or bigger than 3 times of the Initial Viscosity or the mixture gels after 7 days at 50° C., the sample fails the heat-age stability test.

Water Resistance Tests

Black wood substrate was applied with two-layer coatings by applying 80-90 g/m² of a test coating composition for each layer. After the first coat, panels were left at room temperature for 4 hours and then sanded with sand paper. After the second coat, panels were allowed to dry at room temperature for 4 hours then in an oven at 50° C. for 48 hours to give coated panels for room temperature (RT) water resistance and hot water resistance tests below:

RT water resistance test: Filter discs were saturated with water at room temperature, placed on the finished panels, and covered with a cap to reduce water evaporation. After 24 hours, the cap was removed. Tested areas were wiped with wet facial tissues and allowed to dry at room temperature to observe the damage degree.

Hot water resistance test: First, 10-20 mL of boiling water were applied to the surface of the coated panels, and then a stainless steel cup filled with 350-500 mL of boiling water was placed on top of the coated panels so that boiling water resided between the bottom of the cup and the coated panels. After 30 minutes (min), the cup was removed and water residue on the coated panels was wiped by tissue. After 1 hour, trace left on the surface of the coated panels was rated.

RT water resistance and hot water resistance, respectively, are rated as the scale of 0-5, where 0 is the worst, and 5 is the best, as follows:

5—No change: Test area indistinguishable from adjacent surrounding area.

4—Minor change: Test area distinguishable from adjacent surrounding area, only when the light source is mirrored on the test surface and is reflected towards the observer's eye, for example, discoloration; change in gloss and color; and/or no change in the surface structure such as swelling, fiber raising, cracking and/or blistering.

3—Moderate change: Test area distinguishable from adjacent surrounding area, visible in several viewing directions, for example, discoloration; change in gloss and color; and/or no change in the surface structure such as swelling, fiber raising, cracking and/or blistering.

2—Significant change: Test area clearly distinguishable from adjacent surrounding area, visible in all viewing directions, for example, discoloration; change in gloss and color; and/or slightly change in the surface structure such as swelling, fiber raising, cracking and/or blistering.

1—Strong change: The structure of the surface being distinctly changed and/or discoloration, change in gloss and color, and/or the surface material being totally or partially removed, and/or the filter paper adhering to the surface.

Acceptable hot water resistance is 3 or higher.

Alcohol Resistance, Acetic Acid Resistance and Alkaline Resistance Tests

Preparation of panels: Panels were prepared by brush applying three coats at 80-90 g/m² over each type of wood. After the first coat, panels were left at room temperature for 4 hours then sanded with sand paper. After the second coat, panels were allowed to dry at room temperature for 4 hours and then in an oven at 50° C. for 48 hours before running the following tests, respectively.

Alcohol resistance test: Filter discs were saturated with an aqueous ethanol solution (48%), placed on the finished panels, and covered with a cap to reduce evaporation. After 1 hour, the cap was removed. Tested areas were wiped with wet facial tissues and allowed to dry at room temperature to observe the damage degree.

Acid resistance test: Filter discs were saturated with an aqueous an aqueous glacial acetic acid solution (10%), placed on the finished panels, and covered with a cap to reduce evaporation. After 16 hours, the cap was removed. Tested areas were wiped with wet facial tissues and allowed to dry at room temperature to observe the damage degree.

Alkali resistance test: Filter discs were saturated with an aqueous sodium carbonate (Na$_2$CO$_3$) solution (10%), placed on the finished panels, and covered with a cap to reduce evaporation. After 16 hours, the cap was removed. Tested areas were wiped with wet facial tissues and allowed to dry at room temperature to observe the damage degree.

Degree of damage for the alcohol resistance, acetic acid resistance and alkaline resistance tests, respectively, is rated as the scale of 0-5, where 0 is the worst, and 5 is the best, as follows:

5—No change: Test area indistinguishable from adjacent surrounding area;

4—Minor change: Test area distinguishable from adjacent surrounding area, only when the light source is directed on the test surface and reflected towards the observer's eye. The minor change could be some slight discoloration and change in gloss, but no change in the surface structure such as swelling, fiber raising, cracking and/or blistering;

3—Moderate change: Test area distinguishable from adjacent surrounding area, visible in several viewing directions, for example, discoloration; change in gloss and color; but no change in the surface structure such as swelling, fiber raising, cracking and/or blistering;

2—Significant change: Test area clearly distinguishable from adjacent surrounding area, visible in all viewing directions, for example, discoloration; change in gloss and color; and/or slightly change in the surface structure such as swelling, fiber raising, cracking and/or blistering.

1—Strong change: The structure of the surface being distinctly changed and/or discoloration, change in gloss and color, and/or the surface material being totally or partially removed, and/or the filter paper adhering to the surface.

The higher the rating level, the better the resistance. Acceptable acetic acid resistance is 4 or higher. Acceptable alkaline resistance is 3 or higher. Acceptable alcohol resistance is 4 or higher.

Synthesis of Acetoacetamidoethyl Methacrylate (N-AAEM)

Methacrylic anhydride (107.1 g, 0.695 mol) was added slowly to a solution of N-(2-hydroxyethyl) acetoacetamide (N-AAEM precursor) (77.6 g, 0.535 mol) in dry tetrahydrofuran (THF) (200 mL). Then pyridine (42.3 g, 43 mL, 0.535 mol) was added slowly to the mixture while stirring at 0° C. The obtained yellow solution was stirred at 0° C. for 5 hours and then naturally raised to room temperature with stirring to complete the reaction. Thin Layer Chromatography (TLC) confirmed the completion of the reaction. After cooling the obtained mixture to 0° C., 450 mL HCl (1M) was added slowly to the cooled mixture and stirred for a while. Then the organic layer was separated, washed with water (100 mL) twice, and dried with anhydrous sodium sulfate which was then removed by filtration. Butylated hydroxytoluene (BHT) (120 mg) was added to the resulting organic layer, which was then concentrated under reduced pressure at 25° C. The residue was purified by flash chromatography (silica gel columns; fluid phase:petroleum ether:ethyl acetate=1:1) to give a white solid (65 g, yield: 57%) with 300 ppm BHT. The structure of the obtained product (acetoacetamidoethyl methacrylate) was confirmed by $^1$H Nuclear Magnetic Resonance (NMR) spectroscopy with peaks having the following chemical shifts: 6.15 ppm, 5.60 ppm and 1.956 ppm (hydrogens on carbon-carbon double bond); 4.25 ppm and 3.59 ppm (hydrogens on ethoxyl link); 3.435 ppm and 2.26 ppm (hydrogens on acetoacetate).

Examples (Exs) 1-3

Preparation of Monomer Emulsion 1 (MEI): SLS surfactant (4.5 g, 25% active) was dissolved in deionized (DI) water (51.2 g), with stirring, and then monomers in MEI as listed in Table 1 were slowly added to the agitated solution to get the ME1.

Preparation of Monomer Emulsion 2 (ME2): SLS surfactant (4.5 g, 25% active) was dissolved in DI water (54.5 g), with stirring, and then monomers in ME2 as listed in Table 1 were slowly added to the agitated solution to get the ME2.

A solution containing SLS surfactant (7.6 g, 25% active) and DI water (199.9 g) was placed in a 5 liter 4-neck round-bottom flask equipped with a thermocouple, a cooling condenser and an agitator, and heated to 85° C. under nitrogen. An aqueous sodium carbonate solution (0.6 g sodium carbonate in 16.2 g DI water), an aqueous ammonia persulfate (APS) initiator solution (0.6 g APS in 6.5 g DI water), and 5% of the MEI were added to the flask. In 5 min, initiation of polymerization was confirmed by the increase of temperature by 3° C. and a change of the external appearance of the reaction mixture. After generation of heat had ended, the remainder of the MEI was added gradually to the flask over a period of 45 min, with stirring. At the same time, an aqueous APS solution (0.6 g APS in 42.7 g DI water) was added gradually to the flask over 45 min. Polymerization reaction temperature was maintained at 84 to 86° C. After completing the addition, the vessel that containing the ME1 and the feeding pipes leading into the flask were rinsed with DI water (6.5 g), and the rinse was added back to the flask. After that, the reaction mixture was held at 82-86° C. for 30 min.

The ME2 was then added in the same manner as the ME1 over 45 min. At the same time, an aqueous APS solution (0.6 g APS in 42.7 g DI water) was added gradually to the flask over a period of 45 min. Upon completing the addition, the reaction mixture was held at 70° C. for 60 min. An aqueous solution of t-BHP (0.5 g, 70% active) in DI water (6.5 g) and an aqueous solution of IAA (0.2 g, in 7.5 g DI water) were added into the flask. The contents of the flask were cooled to 50° C. and then neutralized to pH 7.0-8.0 with ammonia (25%). The contents of the flask were held at 45 to 50° C. for 10 min. The resulting dispersion was cooled to room temperature and filtered to obtain the aqueous polymer dispersion.

Ex 4

Preparation of Monomer Emulsion 1 (ME1): SLS surfactant (2.7 g, 25% active) was dissolved in DI water (30.7 g), with stirring, and then monomers listed in Table 1 were slowly added to the agitated solution to get the ME1.

Preparation of Monomer Emulsion 2 (ME2): SLS surfactant (6.4 g, 25% active) was dissolved in DI water (76.3 g), with stirring, and then monomers listed in Table 1 were slowly added to the agitated solution to get the ME2.

A solution containing SLS surfactant (7.6 g, 25% active) and DI water (199.9 g) was placed in a 5 liter 4-neck round-bottom flask equipped with a thermocouple, a cooling condenser and an agitator, and heated to 85° C. under nitrogen. An aqueous sodium carbonate solution (0.6 g sodium carbonate in 16.2 g DI water), an aqueous ammonia persulfate (APS) initiator solution (0.6 g APS in 6.5 g DI water), and 5% of the MEI were added to the flask. In 5 min, initiation of polymerization was confirmed by the increase of temperature by 3° C. and a change of the external appearance of the reaction mixture. After generation of heat had ended, the remainder of the MEI was added gradually to the flask over a period of 45 min, with stirring. At the same time, an aqueous APS solution (0.6 g APS in 42.7 g DI water) was added gradually to the flask over 45 min. Polymerization reaction temperature was maintained at 84 to 86° C. After completing the addition, the vessel that containing the ME1 and the feeding pipes leading into the flask were rinsed with DI water (6.5 g), and the rinse was added back to the flask. After that, the reaction mixture was held at 82-86° C. for 30 min.

The ME2 was then added in the same manner as the ME1 over 45 min. At the same time, an aqueous APS solution (0.6 g APS in 42.7 g DI water) was added gradually to the flask over a period of 45 min. Upon completing the addition, the reaction mixture was held at 70° C. for 60 min. An aqueous solution of t-BHP (0.5 g, 70% active) in DI water (6.5 g) and an aqueous solution of IAA (0.2 g, in 7.5 g DI water) were added into the flask. The contents of the flask were cooled to 50° C. and then neutralized to pH 7.0-8.0 by ammonia (25%). The contents of the flask were held at 45 to 50° C. for 10 min. The resulting dispersion was cooled to room temperature and filtered to obtain the aqueous polymer dispersion.

Ex 5

Preparation of Monomer Emulsion 1 (ME1): SLS surfactant (4.17 g, 25% active) was dissolved in DI water (47.28 g), with stirring, and then monomers listed in Table 1 were slowly added to the agitated solution to get the ME1.

Preparation of Monomer Emulsion 2 (ME2): SLS surfactant (2.8 g, 25% active) was dissolved in DI water (33.6 g), with stirring, and then monomers listed in Table 1 were slowly added to the agitated solution to get the ME2.

A solution containing SLS surfactant (5.8 g, 25% active) and DI water (154 g) was placed in a 5 liter 4-neck round-bottom flask equipped with a thermocouple, a cooling condenser and an agitator, and heated to 85° C. under nitrogen. An aqueous sodium carbonate solution (0.45 g sodium carbonate in 15 g DI water), an aqueous ammonia persulfate (APS) initiator solution (0.45 g APS in 5 g DI water), and 5% of the MEI were added to the flask. In 5 min, initiation of polymerization was confirmed by the increase of temperature by 3° C. and a change of the external appearance of the reaction mixture. After generation of heat had ended, the remainder of the MEI was added gradually to the flask over a period of 54 min, with stirring. At the same time, an aqueous APS solution (0.24 g APS in 20 g DI water) was added gradually to the flask over 54 min. Polymerization reaction temperature was maintained at 84 to 86° C. After completing the addition, the vessel that containing the ME1 and the feeding pipes leading into the flask were rinsed with DI water (5 g), and the rinse was added back to the flask. After that, the reaction mixture was held at 82-86° C. for 30 min.

The ME2 was then added in the same manner as the ME1 over 36 min. At the same time, an aqueous APS solution (0.16 g APS in 13 g DI water) was added gradually to the flask over a period of 36 min. Upon completing the addition, the reaction mixture was held at 70° C. for 60 min. An aqueous solution of t-BHP (0.8 g, 70% active) in DI water (10 g) and an aqueous solution of IAA (0.4 g, in 12 g DI water) were then added into the flask. The contents of the flask were cooled to 50° C. and then neutralized to pH 7.0-8.0 with ammonia (25%). The contents of the flask were held at 45 to 50° C. for 10 min. The resulting dispersion was cooled to room temperature and filtered to obtain the aqueous polymer dispersion.

Comparative (Comp) Ex 1

Preparation of Monomer Emulsion (ME): SLS surfactant (9.1 g, 25% active) was dissolved in DI water (105.7 g), with stirring, and then monomers listed in Table 1 were slowly added to the agitated solution to get the ME.

A solution containing SLS surfactant (7.6 g, 25% active) and DI water (199.9 g) was placed in a 5 liter 4-neck round-bottom flask equipped with a thermocouple, a cooling condenser and an agitator, and heated to 85° C. under nitrogen. An aqueous sodium carbonate solution (0.6 g sodium carbonate in 16.2 g DI water), an aqueous ammonia persulfate (APS) initiator solution (0.6 g APS in 6.5 g DI water), and 2.5% of the ME were added to the flask. In 5 min, initiation of polymerization was confirmed by the increase of temperature by 3° C. and a change of the external appearance of the reaction mixture. After generation of heat had ended, the remainder of the ME was added gradually to the flask over a period of 90 min, with stirring. At the same time, an aqueous APS solution (0.6 g APS in 42.7 g DI water) was added gradually to the flask over 90 min. Polymerization reaction temperature was maintained at 84 to 86° C. After completing the addition, the vessel that containing the ME and the feeding pipes leading into the flask were rinsed with DI water (6.5 g), and the rinse was added back to the flask.

Upon completing the addition, the reaction mixture was held at 70° C. for 60 min. An aqueous solution of t-BHP (0.5 g, 70% active) in DI water (6.5 g) and an aqueous solution of IAA (0.2 g, in 7.5 g DI water) were then added into the flask. The contents of the flask were cooled to 50° C. and then neutralized to pH 7.0-8.0 with ammonia (25%). The contents of the flask were held at 45 to 50° C. for 10 min. The resulting dispersion was cooled to room temperature and filtered to obtain the aqueous polymer dispersion.

Comp Ex 2

Preparation of Monomer Emulsion 1 (ME1): Fes-32 Surfactant (13.90 g, 31% active) was dissolved in DI water (240.47 g), with stirring, and then monomers listed in Table 1 were slowly added to the agitated solution to get the ME1.

Preparation of Monomer Emulsion 1 (ME1): Fes-32 Surfactant (10.31 g, 31% active) was dissolved in DI water (76.03 g), with stirring, and then monomers listed in Table 1 were slowly added to the agitated solution to get the ME2.

A solution containing Fes-32 Surfactant (2.53 g, 31% active) and DI water (369.60 g) was placed in a 5 liter 4-neck round-bottom flask equipped with a thermocouple, a cooling condenser and an agitator, and heated to 87° C. under nitrogen. An aqueous ammonia persulfate (APS) initiator solution (3.74 g APS in 10.56 g DI water), and 4.7% of the ME1 were added to the flask. In 5 min, initiation of polymerization was confirmed by the increase of temperature by 5° C. and a change of the external appearance of the reaction mixture. After generation of heat had ended, the remainder of the ME1 was added gradually to the flask over a period of 80 min, with stirring. At the same time, an aqueous ammonia persulfate (APS) solution (2.03 g APS in 50.69 g DI water) and an aqueous ammonia solution (11.46 g 25% Ammonia in 2.11 g DI water) were added gradually to the flask over a period of 140 min. Polymerization reaction temperature was maintained at 84 to 86° C. After completing the addition, the vessel that containing the ME1 and the feeding pipes leading into the flask were rinsed with DI water (8.45 g), and the rinse was added back to the flask.

The ME2 was then added in the same manner as the ME1 over 60 min. Upon completing the addition, the reaction mixture was held at 85° C. for 15 min. An aqueous solution of t-BHP (1.19 g, 70% active) in DI water (10.56 g) and IAA (0.84 g, in 13.94 g DI water) was then added into the flask. The contents of the flask were cooled to 50° C. and held at 45 to 50° C. for 10 min. The resulting dispersion was cooled to room temperature and filtered to obtain the aqueous polymer dispersion.

Comp Ex 3

Preparation of Monomer Emulsion 1 (ME1): SLS Surfactant (14.25 g, 25% active) was dissolved in DI water (181.4 g), with stirring, and then monomers listed in Table 1 were slowly added to the agitated solution to get the ME1.

Preparation of Monomer Emulsion 1 (ME1): SLS Surfactant (14.38 g, 25% active) was dissolved in DI water (171.96 g), with stirring, and then monomers listed in Table 1 were slowly added to the agitated solution to get the ME2.

A solution containing SLS Surfactant (23.87 g, 25% active) and DI water (630.7 g) was placed in a 5 liter 4-neck persulfate (APS) initiator solution (1.84 g APS in 23.8 g DI water), and 5% of the ME1 were added to the flask. In 5 min, initiation of polymerization was confirmed by the increase of temperature by 3° C. and a change of the external appearance of the reaction mixture. After generation of heat had ended, the remainder of the ME1 was added gradually to the flask over a period of 45 min, with stirring. At the same time, an aqueous ammonia persulfate (APS) solution (0.9 g APS in 67.30 g DI water) was added gradually to the flask over a period of 45 min. Polymerization reaction temperature was maintained at 84 to 86° C. After completing the addition, the vessel that containing the ME1 and the feeding pipes leading into the flask were rinsed with DI water (20.4 g), and the rinse was added back to the flask. After that, the reaction mixture was held at 82-86° C. for 30 min.

The ME2 was then added in the same manner as the ME1 over 45 min. At the same time, an aqueous ammonia persulfate (APS) solution (0.9 g APS in 67.30 g DI water) was added gradually to the flask over a period of 45 min. Upon completing the addition, the reaction mixture was held at 70° C. for 60 min. An aqueous solution of t-BHP (1.63 g, 70% active) in DI water (27.2 g) and IAA (0.82 g, in 30.6 g DI water) was then added into the flask. The contents of the flask were cooled to 50° C., then neutralized to a pH value of 7.0-8.0 with ammonia (25%), and held at 45 to 50° C. for an additional 10 min. The resulting dispersion was cooled to room temperature and filtered to obtain the aqueous polymer dispersion.

Properties of the MP dispersions prepared above were given in Table 1.

TABLE 1

| Monomer Compositions and Properties | | | | | | | | | |
|---|---|---|---|---|---|---|---|---|---|
| Aqueous polymer dispersion | | Ex 1 | Ex 2 | Ex 3 | Ex 4 | Ex 5 | Comp Ex 1 | Comp Ex 2 | Comp Ex 3 |
| Monomers in ME1 for preparing polymer A, gram | MMA | 134.2 | 134.2 | 119.7 | 80.51 | 123.99 | 212.7 | 422.45 | 134.49 |
| | ALMA | 9.5 | 9.5 | 9.5 | 5.68 | 8.74 | 9.5 | 29.55 | |
| | MAA | 3.8 | 3.8 | 3.8 | 2.26 | 3.49 | 11.4 | 11.72 | |
| | N-AAEM | | | 18.9 | 0 | 0 | 18.9 | | |
| | AAEM | | | | | | | | 28.85 |
| | EHA | | | | | | 84.5 | | 272.95 |
| | PEM | | | | | | | | 13.83 |
| | ST | | | | | | | | 127.04 |
| | BA | 41.6 | 41.6 | 37.1 | 24.98 | 38.46 | 41.6 | 130.65 | |
| Monomers in ME2 for preparing polymer B, gram | MMA | 78.5 | 84 | 87.7 | 113.59 | 47.04 | | 247.13 | 118.48 |
| | EHA | 84.5 | 90.4 | 94.4 | 122.28 | 50.80 | | 265.29 | 117.34 |
| | ST | | | | | | | | 127.83 |
| | MAA | 7.6 | 7.6 | 7.6 | 10.61 | 4.67 | | 23.54 | |
| | N-AAEM | 18.9 | 7.6 | | 18.87 | 14.58 | | | |
| | AAEM | | | | | | | 59.7 | 19.22 |
| Properties | | | | | | | | | |
| Tg of polymer A//Tg of polymer B, ° C. | | 54//−17 | 54//−17 | 54//−16 | 54//−17 | 54//−17 | 14* | 54//−17 | −20//11 |
| MFFT, ° C. | | 43 | 45 | 40 | <10 | 60 | 37 | 55 | NA |
| Average PS[2], nm | | 121 | 93 | 92 | 111 | 137 | 82 | 100 | 117 |
| Solids content[1], % | | 44.80 | 45.00 | 43.94 | 43.85 | 43.74 | 44.30 | 44.7 | 51.17 |
| pH | | 7.96 | 8.31 | 8.32 | 7.57 | 8.53 | 8.06 | | 1.27 |
| Viscosity | | 121 | 93 | 92 | 111 | 137 | 350 | | NA |

[1]Solids content was measured by weighting 0.7 ± 0.1 g of a sample (wet weight of the sample is denoted as "W1"), putting the sample into an aluminum pan (weight of aluminum pan is denoted as "W2") in an oven at 150° C. for 25 min, and then cooling and weighting the aluminum pan with the dried sample with total weight denoted as "W3". "W3 − W2" refers to dry or solids weight of the sample. Solids content is calculated by (W3 − W2)/W1*100%.
[2]Average PS: Average particle size was measured by Brookhaven BI-90 Plus Particle Size Analyzer.
*Tg for the one-stage polymer.

round-bottom flask equipped with a thermocouple, a cooling condenser and an agitator, and heated to 85° C. under nitrogen. An aqueous sodium carbonate solution (1.84 g sodium carbonate in 61.20 g DI water), an aqueous ammonia Moreover, a mixture prepared by adding Jeffamine D-230 (2.7% by weight based on the weight of polymer solids in Comp Ex 3) gelled after 7 days at 50° C. In contrast, a mixture comprising the aqueous polymer dispersion of Ex 1 and Jeffamine D-230 (2.7% by weight based on the weight of polymer solids in Ex 1) passed the heat-age stability testing at 50° C. for 7 days (i.e., no gelation), indicating the aqueous polymer dispersion of Ex 1 has good heat-age stability.

Coating Compositions

The as prepared aqueous polymer dispersions of Exs 1-5 and Comp Exs 1 and 2 were used as binders for preparing coating compositions, based on compositions given in Table 2. All ingredients were mixed sequentially with stirring at 600 rpm/min to form coating compositions.

TABLE 2

| Coating Compositions | | | | | |
|---|---|---|---|---|---|
| Coating Composition | Coatings 1-3 | Coating 4 | Coating 5 | Comp Coating 1 | Comp Coating 2 |
| Binder Name | Exs 1-3 | Ex 4 | Ex 5 | Comp Ex 1 | Comp Ex 2 |
| Binder, g | 70 | 70 | 71 | 70 | 70 |
| DOWANOL DPM, g | 3 | 0.5 | 4 | 2.5 | |
| DOWANOL EB, g | | | | | 3.5 |
| DOWANOL DPnB, g | 4 | 1 | 5.5 | 4 | 3 |
| BYK-346, g | 0.5 | 0.5 | 0.5 | 0.5 | 0.3 |
| Tego Airex 902W, g | 0.3 | 0.3 | 0.3 | 0.3 | 0.3 |
| ACRYSOL RM-8W, g | 0.5 | 0.5 | 0.5 | 0.5 | 0.3 |
| ACRYSOL RM-5000, g | 0.5 | 0.5 | 0.5 | 0.5 | |
| Water, g | 21.2 | 26.7 | 17.7 | 21.7 | 22.6 |
| Total, g | 100 | 100 | 100 | 100 | 100 |
| Solids content | 31.3% | 31.0% | 31.1% | 31.0% | 31.5 |

The obtained coating compositions were evaluated according to the test methods described above and results of properties are shown in Table 3. As shown in Table 3, coating compositions comprising the binders of Exs 1-5 all provided coating films with surprisingly good hot water resistance (rating≥3) as well as good water resistance, alcohol resistance, alkali resistance and acetic acid resistance. Particularly, the binder of Ex 1 provided excellent hot water resistance rated as high as 4 and the binders of Exs 1, 3-5 provided water resistance, alcohol resistance, alkali resistance and acetic acid resistance all rated as 4 or higher. As compared to the binder of Ex 1, one-stage binder of Comp Ex 1 failed to provide coating films with desirable hot water resistance. The binder of Comp Ex 2 prepared from AAEM provided coatings with poor acid resistance (Comp Coating 2).

TABLE 3

| | | | | Comp | | | Comp |
|---|---|---|---|---|---|---|---|
| | Coating 1 | Coating 2 | Coating 3 | Coating 1 | Coating 4 | Coating 5 | Coating 2 |
| Binder | Ex 1 | Ex 2 | Ex 3 | Comp Ex 1 | Ex 4 | Ex 5 | Comp Ex 2 |
| Hot water resistance | 4 | 3 | 3 | 2 | 3 | 3 | 4 |
| RT water resistance | 5 | 4 | 5 | 5 | 5 | 5 | 4 |
| Alcohol resistance | 5 | 5 | 4 | 5 | 5 | 4 | 4 |
| Acid resistance | 4 | 4 | 4 | 4 | 4 | 4 | 2 |
| Alkali resistance | 5 | 3 | 4 | 4 | 4 | 4 | 4 |

What is claimed is:

1. An aqueous dispersion of multistage polymeric particles, wherein the multistage polymeric particles comprise, by weight based on the weight of the multistage polymeric particles, from 30% to 60% of a polymer A and from 40% to 70% of a polymer B, wherein the polymer A has a higher glass transition temperature than the polymer B;

wherein the multistage polymeric particles comprise by weight based on the weight of the multistage polymeric particles, from 2% to 15% of structural units of an acetoacetamide functional monomer having the structure of formula (I):

(I)

wherein R$_1$ is selected from the following structure:

(II-a)

-continued (II-b)

(II-c)

(II-d)

or (II-e)

where $R_2$, $R_4$, $R_8$, $R_{10}$, $R_{12}$ and $R_{13}$ are each independently an alkylene group having 2 to 20 carbon atoms; $R_3$, $R_5$, $R_6$, $R_7$ and $R_{11}$ are each independently hydrogen or an alkyl group having from 1 to 8 carbon atoms; $R_9$ is hydrogen or an alkyl group having 1 to 20 carbon atoms; and X is O or N;

from 0.1% to 10% of structural units of a monoethylenically unsaturated acid monomer, a salt thereof, or mixtures thereof;

structural units of a multiethylenically unsaturated monomer; and structural units of a monoethylenically unsaturated non-ionic monomer.

2. The aqueous dispersion of claim 1, wherein the acetoacetamide functional monomer is an acetoacetamide alkyl (meth) acrylate.

3. The aqueous dispersion of claim 1, wherein the acetoacetamide functional monomer is selected from the group consisting of acetoacetamidoethyl methacrylate, acetoacetamidoethyl acrylate, acetoacetamidoethyl (meth) acrylamide, acetoacetamidoethyl maleate, acetoacetamidoethyl itaconate, or mixtures thereof.

4. The aqueous dispersion claim 1, wherein the polymer B comprises, by weight based on the weight of the polymer B, from 2.8% to 30% of structural units of the acetoacetamide functional monomer.

5. The aqueous dispersion of claim 1, wherein the polymer A comprises, by weight based on the weight of the polymer A, from zero to 15% of structural units of the acetoacetamide functional monomer.

6. The aqueous dispersion of claim 1, wherein the polymer A comprises, by weight based on the weight of the polymer A, from 0.1% to 12% of structural units of the multiethylenically unsaturated monomer.

7. The aqueous dispersion of claim 1, wherein the multiethylenically unsaturated monomer contains two or more different ethylenically unsaturated polymerizable groups.

8. The aqueous dispersion of claim 7, wherein the multiethylenically unsaturated monomer is selected from the group consisting of (2-methyl) allyl (meth) acrylate, (2-methyl) allyl (meth) acrylamide, (2-methyl) allyl oxy-ethyl (meth) acrylate, crotyl (meth) acrylate, dicyclopentenyl (meth) acrylate, dicyclopentenyl ethyl (meth) acrylate, diallyl maleate, or mixtures thereof.

9. The aqueous dispersion of claim 1, wherein the polymer B comprises, by weight based on the weight of the polymer B, from 2% to 15% of structural units of the monoethylenically unsaturated acid monomer and salt thereof.

10. The aqueous dispersion of claim 1, wherein the polymer A comprises, by weight based on the weight of the polymer A, from 0.1% to 5% of structural units of the monoethylenically unsaturated acid monomer and salt thereof.

11. The aqueous dispersion of claim 1, wherein the monoethylenically unsaturated acid monomer is methacrylic acid, phosphoethyl methacrylate, or a mixture thereof.

12. The aqueous dispersion of claim 1, wherein the multistage polymeric particles have a glass transition temperature in the range of from-10 to 80° C.

13. The aqueous dispersion of claim 1, wherein the Tg difference between the polymer A and the polymer B is 20° C. or more.

14. A process for preparing the aqueous dispersion of multistage polymeric particles of claim 1, by multistage free-radical polymerization, comprising at least one stage of polymerization forming the polymer A and at least one stage of polymerization forming the polymer B.

15. A coating composition comprising the aqueous dispersion of claim 1.

* * * * *